United States Patent [19]

Cheetham et al.

[11] Patent Number: 4,727,495

[45] Date of Patent: Feb. 23, 1988

[54] DATA COMMUNICATION SYSTEM

[75] Inventors: Robert Cheetham, Longford, England; Martin Roberts, Phoenix, Ariz.

[73] Assignee: The General Electric Company, p.l.c., United Kingdom

[21] Appl. No.: 785,152

[22] Filed: Oct. 7, 1985

[30] Foreign Application Priority Data

Oct. 8, 1984 [GB] United Kingdom ............... 8425375

[51] Int. Cl.$^4$ ............................................... H04J 3/06
[52] U.S. Cl. .................................. 364/514; 364/517; 370/112
[58] Field of Search .................... 364/514–517; 340/825.64, 64, 92, 112

[56] References Cited

U.S. PATENT DOCUMENTS

| 4,394,774 | 7/1983 | Widergren et al. | 364/514 X |
| 4,531,211 | 7/1985 | Hadziomerovic | 370/112 X |
| 4,531,212 | 7/1985 | Hadziomerovi | 370/112 X |
| 4,577,314 | 3/1986 | Chu et al. | 370/94 |

FOREIGN PATENT DOCUMENTS

| 0075998 | 9/1982 | European Pat. Off. |
| 0105212 | 9/1983 | European Pat. Off. |
| 0147865 | 12/1984 | European Pat. Off. |
| 1518983 | 7/1975 | United Kingdom |
| 2126843 | 9/1983 | United Kingdom |

OTHER PUBLICATIONS

*Proceedings of the International Switching Symposium,* Session 31 B, Paper 6, May 7-11, 1984, Florence, IT, pp. 1-7, North-Holland; G. Taille et al: "A Laboratory Model of a Signalling Transfer Point (STP)", pp. 2-4; paragraph 3.

*Proceedings of the International Switching Symposium,* Session 21B, Paper 3, May 7-11, 1984, Florence, IT, pp. 1-6, North-Holland; G. Ribbeck et al: "EWSD as a Basis for ISDN", pp. 4, 5; paragraph 5.

*Proceedings of the International Switching Symposium,* Session 21B, Paper 2, May 7-11, 1984, Florence, IT, pp. 1-8, North-Holland; S. Giorcelli et al: "Experiment of ISDN Facilities in a Proteo UT10/3 Local Exchange", p. 2, left-hand col, lines 45-64; pp. 2, 3, paragraph 2.2; p. 7, FIG. 2.2.1.

*Primary Examiner*—Gary V. Harkcom
*Assistant Examiner*—H. R. Herndon
*Attorney, Agent, or Firm*—Kirschstein, Kirschstein, Ottinger & Israel

[57] ABSTRACT

The 16 kbit/s HDLC formatted signalling channel for each of 256 ISDN subscribers is separated from the data channel(s) at the exchange line circuit and TMD multiplexed into a 4 Mbit/s stream provided to a common signalling handler. In the handler, a receiving element processes each new bit of the 4 Mbit/s stream with 47 bits read out of a channel parameter store by a channel number provided by a channel allocation store. The 47 bits include the previous 7 received bits and a message byte address for that channel. When those 7 bits and the new bit form a new deformatted message byte, that byte is written into an incoming message store at a location determined by the current channel number and message byte address. Using a FIFO buffer, messages are read from the incoming message store by a processor in the order in which they are completed.

7 Claims, 12 Drawing Figures

| B7 | B6 | B5 | B4 | B3 | B2 | B1 | B0 | FL | AB | SB | |
|----|----|----|----|----|----|----|----|----|----|----|---|
| 0 | 1 | 1 | 1 | 1 | 1 | 1 | 0 | 1 | 0 | 0 | FLAG |
| X | 1 | 1 | 1 | 1 | 1 | 1 | 1 | 0 | 1 | 0 | ABORT |
| X | 0 | 1 | 1 | 1 | 1 | 1 | 0 | 0 | 0 | 1 | STUFFED BIT |
| ANYTHING ELSE | | | | | | | | 0 | 0 | 0 | |

Fig. 7.

| 2 | 1 | 0 | B7 | AB | 2 | 1 | 0 | ID | |
|---|---|---|----|----|----|---|---|----|---|
| X | X | X | 0 | X | 0 | 0 | 0 | 0 | RESET COUNT |
| 0 | 0 | 0 | 1 | X | 0 | 0 | 1 | 0 | INCREMENT COUNT |
| 0 | 0 | 1 | 1 | X | 0 | 1 | 0 | 0 | ↓ |
| 0 | 1 | 0 | 1 | X | 0 | 1 | 1 | 0 | |
| 0 | 1 | 1 | 1 | X | 1 | 0 | 0 | 0 | |
| 0 | 0 | 0 | 1 | X | 1 | 0 | 1 | 0 | |
| 1 | 0 | 1 | 1 | X | 1 | 1 | 0 | 0 | |
| 1 | 1 | 0 | 1 | X | 1 | 1 | 1 | 0 | |
| 1 | 1 | 1 | 1 | 0 | 1 | 1 | 1 | 0 | HOLD COUNT |
| 1 | 1 | 1 | 1 | 1 | 1 | 1 | 1 | 1 | IDLE DETECTED |

Fig. 8.

| 2 | 1 | 0 | SB | FL | 2 | 1 | 0 | BA | EB | |
|---|---|---|----|----|----|---|---|----|----|---|
| 1 | 1 | 1 | X | 1 | 0 | 0 | 0 | 0 | 1 | BYTE ALIGNED FLAG |
| B2 | B1 | B0 | 1 | 0 | B2 | B1 | B0 | 0 | 0 | NO NEW BIT |
| 0 | 0 | 0 | 0 | 0 | 0 | 0 | 1 | 0 | 0 | INCREMENT COUNT |
| 0 | 0 | 1 | 0 | 0 | 0 | 1 | 0 | 0 | 0 | ↓ |
| 0 | 1 | 0 | 0 | 0 | 0 | 1 | 1 | 0 | 0 | |
| 0 | 1 | 1 | 0 | 0 | 1 | 0 | 0 | 0 | 0 | |
| 1 | 0 | 0 | 0 | 0 | 1 | 0 | 1 | 0 | 0 | |
| 1 | 0 | 1 | 0 | 0 | 1 | 1 | 0 | 0 | 0 | |
| 1 | 1 | 0 | 0 | 0 | 1 | 1 | 1 | 0 | 0 | |
| 1 | 1 | 1 | 0 | 0 | 0 | 0 | 0 | 1 | 1 | BYTE AVAILABLE |
| ANYTHING ELSE | | | X | 1 | 0 | 0 | 0 | 0 | 0 | NON-ALIGNED FLAG |

Fig. 9.

| FL | SFL | EB | SFL | |
|----|-----|----|----|---|
| 1  | X   | X  | 1  | FLAG DETECTED |
| 0  | 0   | 0  | 0  | LOOKING FOR FLAG |
| 0  | 0   | 1  | 0  | |
| 0  | 1   | 0  | 1  | SAVE FLAG STATUS |
| 0  | 1   | 1  | 0  | DATA BYTE |

| EB | SVC | VC | SVC | |
|----|-----|----|----|---|
| 0  | 0   | X  | 0  | NOT BYTE, KEEP OLD VALUE |
| 0  | 1   | X  | 1  | |
| 1  | X   | 0  | 0  | BYTE, STORE NEW VALUE |
| 1  | X   | 1  | 1  | |

Fig. 10.

| SFL | FL | EB | SVC | VA | FA | |
|-----|----|----|----|----|----|---|
| 1   | X  | X  | X   | 0  | 0  | RECEIVING FLAGS |
| 0   | 0  | X  | X   | 0  | 0  | MID FRAME |
| 0   | 1  | 0  | X   | 0  | 1  | END OF FRAME, FLAG NOT ALIGNED |
| 0   | 1  | X  | 0   | 0  | 1  | END OF FRAME, INVALID CRC |
| 0   | 1  | 1  | 1   | 1  | 1  | VALID FRAME RECEIVED. |

DATA COMMUNICATION SYSTEM

BACKGROUND OF THE INVENTION

1. Field of the Invention

The present invention relates to a data communication system capable of forming part of an integrated services digital network handling formatted data information channels between a plurality of subscribers. Each channel contains signalling and possibly low speed data information and is carried on a separate link comprising at least one high speed link for its subscriber. The signalling channel messages transmitted by these links are formatted, for example with the particular flag, message, frame check sequence, flag frames according to the international standard High Level Data Link Control (HDLC) protocol.

The data communication system interfaces with each individual subscriber link via a line circuit which separates the incoming data channels from the signal channels to forward the data channels to a digital exchange switch for connection to another subscriber, the line circuits being provided on line cards.

2. Description of Related Art

In a known system the signalling channel is converted from its initial format to some other format pertinent to the internal architecture of the exchange design by the individual provision at each line circuit of a commercially available HDLC chip and the provision at each line card of a microprocessor with RAM and ROM.

A disadvantage of the known system just described is the high cost and high power consumption involved in providing an individual HDLC chip at each line circuit, and message processing means including a microprocessor, RAM and ROM at each line card for handling the deformatted messages. An object of the present invention is to overcome this disadvantage.

SUMMARY OF THE INVENTION

According to the invention there is provided a data communication system for handling a plurality of formatted data information channels each containing signalling and possibly also low speed data information, the system including a line circuit for each data information channel, means for multiplexing the plurality of formatted information channels received at the line circuits into a single time division multiplexed input data stream in which less than one frame of each formatted channel is present in each frame of the multiplexed stream, and deformatting means including receiving and processing means which receive successive bits of the multiplexed imput data stream, process the received bits successively, detects when a complete message byte from an information channel has been received, and writes each detected message byte into an incoming message store for subsequent transmission.

It is envisaged that the invention as described hereinbefore can be useful in cases where the means for separately conveying the formatted data information channels are present in the data communications system other than as the separate links from a subscriber's network terminating equipment into the system.

The data communications system as set out hereinbefore may also be provided with formatting means for receiving unformatted messages from a plurality of further data information channels and transmitting those messages in a single time division multiplexed output data stream.

In this case there will also be provided means for demultiplexing the plurality of formatted further information channels from the single multiplexed output data stream and means for separately conveying each of the plurality of formatted further information channels.

BRIEF DESCRIPTION OF THE DRAWINGS

The invention will now be described in more detail with reference to the examples shown in the accompanying drawings, in which.

DETAILED DESCRIPTION OF THE PREFERRED EMBODIMENTS

Figure 1:
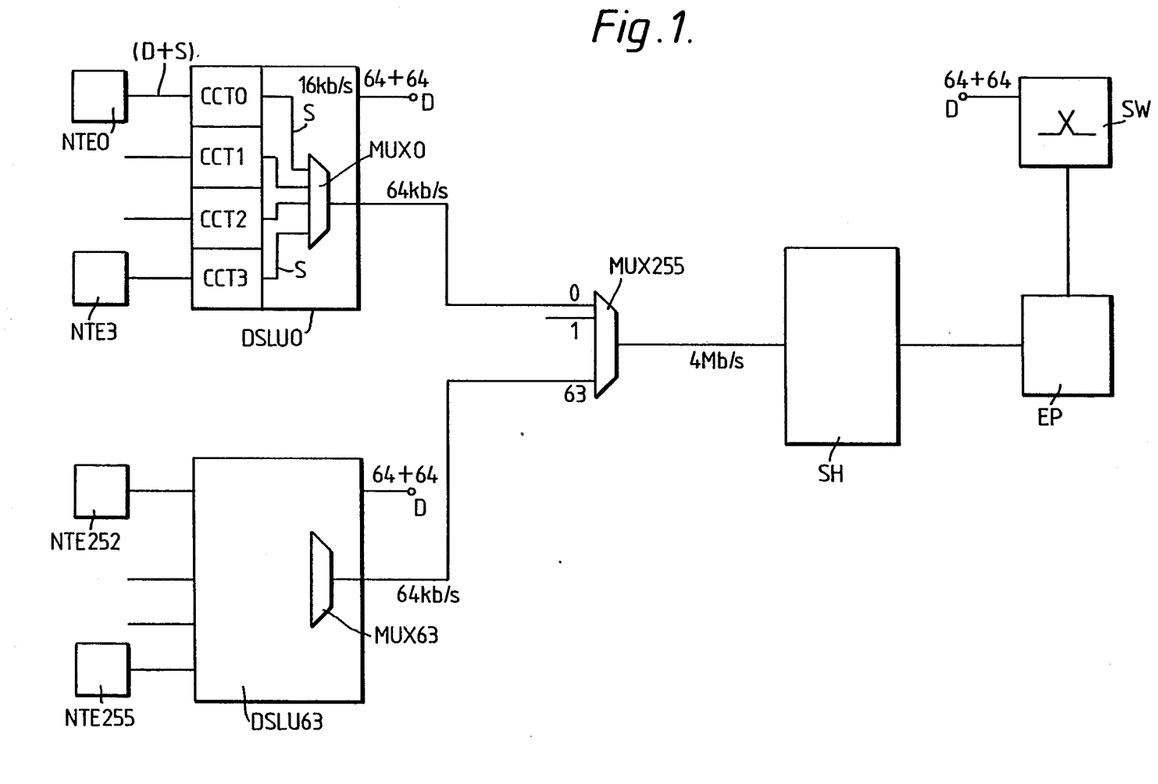
FIG. 1 illustrates the connection of digital subscriber equipments to a digital telephone exchange in an integrated services digital network (ISDN)

Referring now to FIG. 1, four digital subscriber network terminating equipments NTE0 to NTE3 are each connected by a link (D+S) to a respective one of four line circuits CCT0 to CCT3 provided on a line card DSLUO at the periphery of a digital telephone exchange in an integrated services digital network (ISDN). Each link (D+S) has a total each way information capacity of 144K bit/s consisting of two 64K bit/s high speed data channels D and a 16K bit/s signalling channel S. At each of the line circuits CCT0 to CCT3 the incoming data channels D are separated from the signalling channel S. The data channels D are connected to the exchange switch SW. The successive bits of each incoming signalling channel S provide messages formatted with flag, message, frame check sequence, flag frames according to the international standard High Level Data Link (HDLC) protocol, and each of the line circuits CCT0 to CCT3 provides one of these 16K bit/s signalling channels S with its bits serially assembled at the rate of 2 bits per 125 µs. The signalling channels from the four line circuits CCT0 to CCT3 are time division multiplexed by a multiplexor MUX0 to provide a 64K bit/s data stream in which each 125 µs frame has four time slots each containing two successive bits from one of the 16K bit/s signalling channels. 252 further network terminating equipments are similarly connected to groups of four line circuits in each of 63 further line cards where the high speed data channels are similarly separated from the signalling channels and the signalling channels are similarly time division multiplexed. Network terminating equipments NTE 252 to NTE 255 are shown connected to line card DSLU63 and the 64K bit/s output of multiplexor MUX 63 is also shown. The outputs of the 64 multiplexors MUX0 to MUX63 are further time division multiplexed by a multiplexor MUX255 to provide a 4 Mbit/s input data stream to a signalling handler SH in which each 125 μs frame has 256 time slots each containing two successive bits from one of the 16K bit/s signalling channels. The signalling handler SH deformats and processes the messages for all 256 signalling channels, in the manner to be described later with reference to FIGS. 4 and 5, and transmits them to the exchange processor EP.

Figure 2:
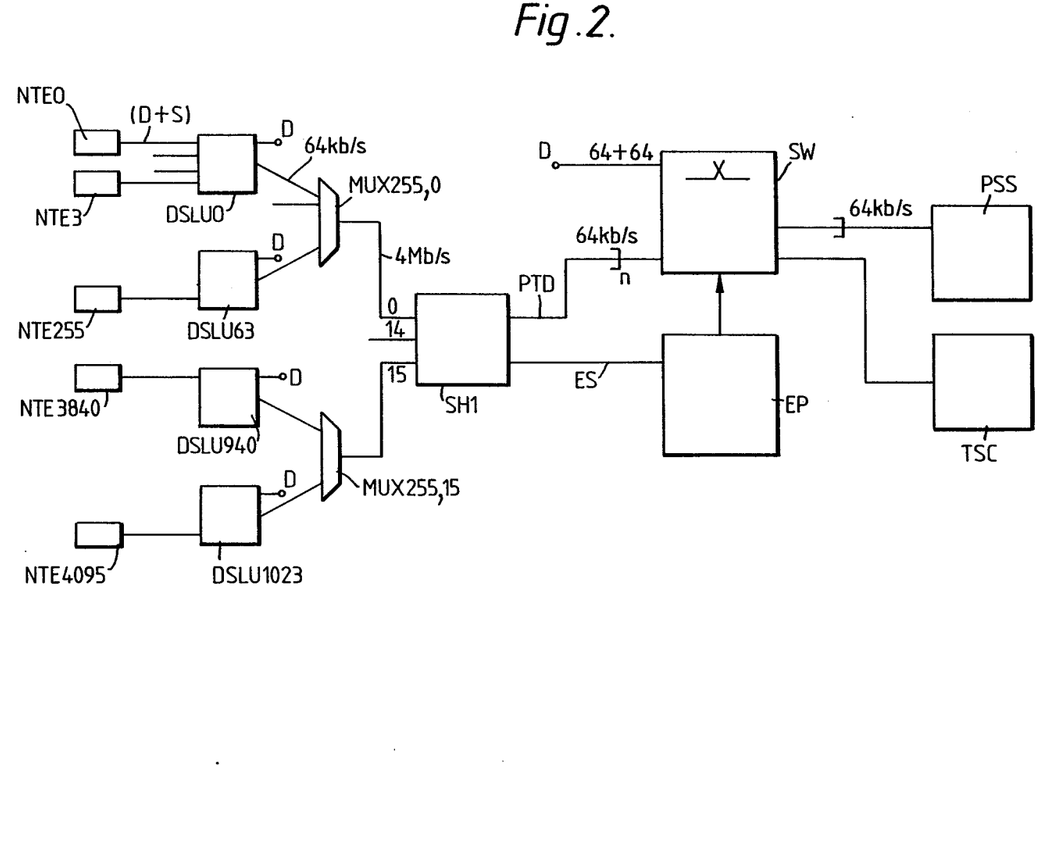
FIG. 2 illustrates a digital telephone exchange in which 16 of the input data streams of FIG. 1 are handled together.

Referring now to FIG. 2, four thousand digital subscriber network terminating equipments NTE0 to NTE4095 are each connected by a link (D+S) in groups of four as described with reference to FIG. 1 to one thousand line cards DSLU0 to DSLU1023 each of which provides a 64K bit/s time division multiplexed signalling data stream as described with reference to FIG. 1. Sixteen further time division multiplexors MUX255,0 to MUX255,15 each provide a 4 Mbit/s input data stream as described with reference to FIG. 1 to a combined signalling handler SH1 which deformats and processes the messages for all 4096 signalling channels. The signalling handler SH1 comprises sixteen signalling handlers each separately deformatting and processing one of the 4 Mbit/s input data streams in the manner to be described later with reference to FIGS. 4 and 5. However it is envisaged that with future high speed technology the sixteen 4 Mbit/s input data streams could be further time division multiplexed into a single 64 Mbit/s input data stream provided to one signalling handler working in the same manner as the signalling handler to be described later with reference to FIGS. 4 and 5. In the arrangement shown in FIG. 2, each of the 16K bit/s signalling channels may, in addition to signalling information, also contain low speed data, for example packet data or telemetry data, according to the CCITT I series recommendations. Means for processing the deformatted messages within the combined signalling handler SH1 will separate the signalling information messages from the low speed data messages. The signalling information ES is transmitted by the signalling handler SH1 to the exchange processor EP, and the low speed data is statistically multiplexed into one or more higher speed channels PTD, for example at 64K bit/s, which are connected via the exchange switch SW to a computer for each low speed data service, for example to a packet switch stream computer PSS and a telemetry service computer TSC.

Figure 3:
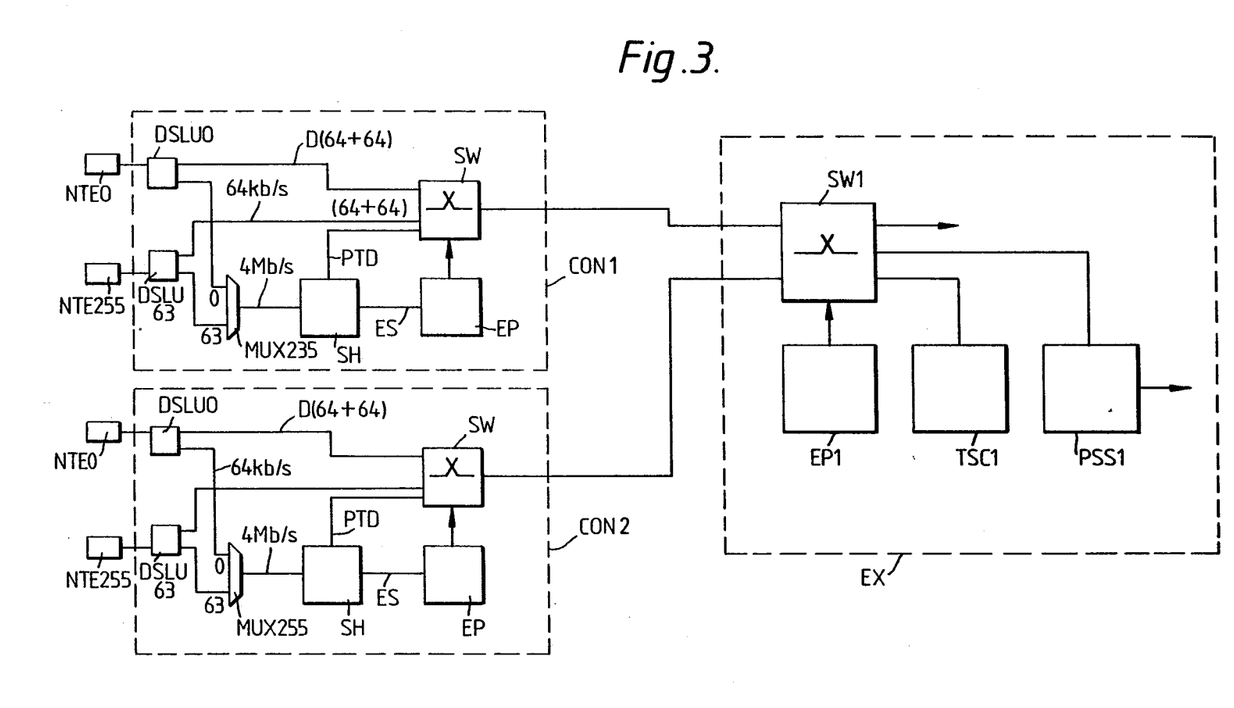
FIG. 3 illustrates a number of separate exchanges each having a signalling handler, these separate exchanges acting as concentrators for the low speed data which is passed to a further exchange having a common computer for each low speed data service.

Referring now to FIG. 3, two separate exchanges CON1 and CON2 are shown which each have a signalling handler SH for a 4 Mbit/s time division multiplexed input data stream as described with reference to FIG. 1. In this case the 4 Mbit/s stream in each exchange CON1 and CON2 has low speed data PTD which is separated from signalling information ES by the respective signalling handler SH and transmitted to the switch SW of the respective exchange and then passed to a further exchange EX having an exchange switch SW1, an exchange processor EP1 and a common computer for each low speed data service, for example a packet switch stream computer PSS1 and a telemetry service computer TSC1. In this case the exchanges CON1 and CON2, each connected to 256 subscriber's equipments, act as concentrators for the low speed data services for those subscribers. Only two concentrators CON1 and CON2 are shown in FIG. 3 but there may be many more connected to the further exchange EX.

Figure 4:
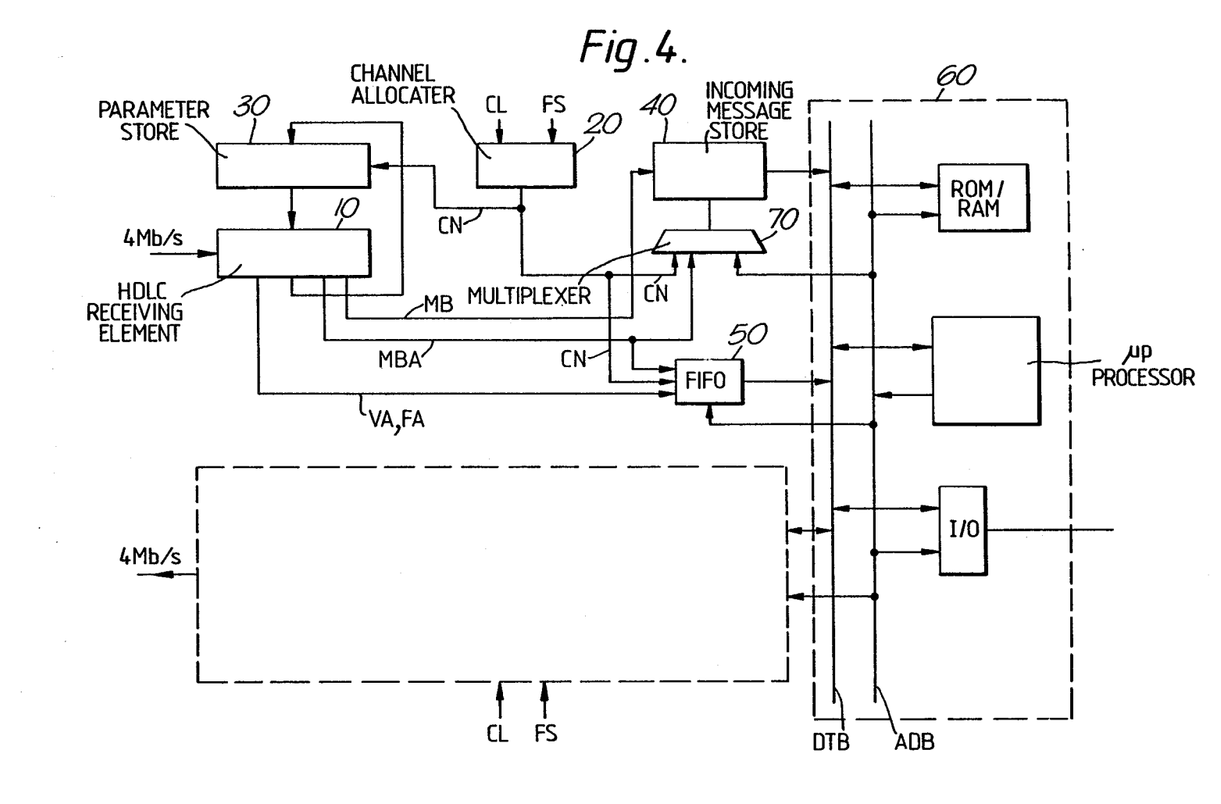
FIG. 4 illustrates the internal structure of each of the signalling handlers shown in FIGS. 1 to 3, and FIGS. 5a–c show details of a multichannel HDLC receiving element which forms part of the signalling handler shown in FIG. 4, and FIGS. 6 to 10 show a series of truth tables.

Referring now to FIG. 4, there is shown the internal structure of the signalling handler SH referred to in the description of FIG. 1. An HDLC multichannel receiving element 10 constitutes receiving and processing means which receives the successive bits of the 4 Mbit/s multiplexed input data stream and processes them one at a time. Input channel allocation means 20, under control of a clock CL and a frame synchronisation signal FS derived from the 4 Mbit/s input stream provides an input channel number CN for each new received bit of the 4 Mbit/s input stream. An input channel parameter store 30 responds to each channel number CN provided by the channel allocation means 20 to read out and provide to the receiving and processing element 10 a set of channel parameters for that channel. The set of channel parameters includes the previous 7 bits received for that channel, each channel byte having 8 bits, information characterising the current status of the input data stream with respect to a single frame of that channel, and a message byte address MBA. The set of channel parameters so read out are processed by the receiving and processing element 10 together with the new received bit to detect when the previous 7 bits together with the new bit form a new message byte MB for that channel and to provide a new set of parameters for that channel which is written back into the channel parameter store 30. Each detected new message byte MB is written into an incoming message store 40 at a location determined by the currently provided channel number CN and message byte address MBA. The receiving element 10, input channel allocation means 20, input channel parameter store 30 and incoming message store 40 together form deformatting means for deriving messages from the 256 16K bit/s signalling channels which are present in the 4 Mbit/s multiplexed input stream.

The receiving and processing means also detects when a complete frame of one of the formatted channels has been received and derives a validity status VA,FA of the message in that frame. A first in, first out (FIFO) buffer 50 is provided into the input of which the location in the incoming message store 40 of the last message byte in each message and the validity status of that message are written in the order in which complete frames of the formatted channels are received.

Message processing means 60 includes a microprocessor μp, memory ROM/RAM, and an input/output unit I/O connected to an address bus ADB and data bus DTB. The message processing means 60 reads complete messages from the incoming message store in the order determined by reading the output of the first in, first out buffer 50.

A multiplexer 70 shares access to the incoming message store 40 between the receiving element 10 and the message processing means 60. This action is performed synchronously and is transparent to the message processing means 60. Writing into the incoming message store 40 takes place in one half cycle of the clock CL and reading out of the incoming message store takes place in the other half cycle of the clock CL.

Figure 5A:
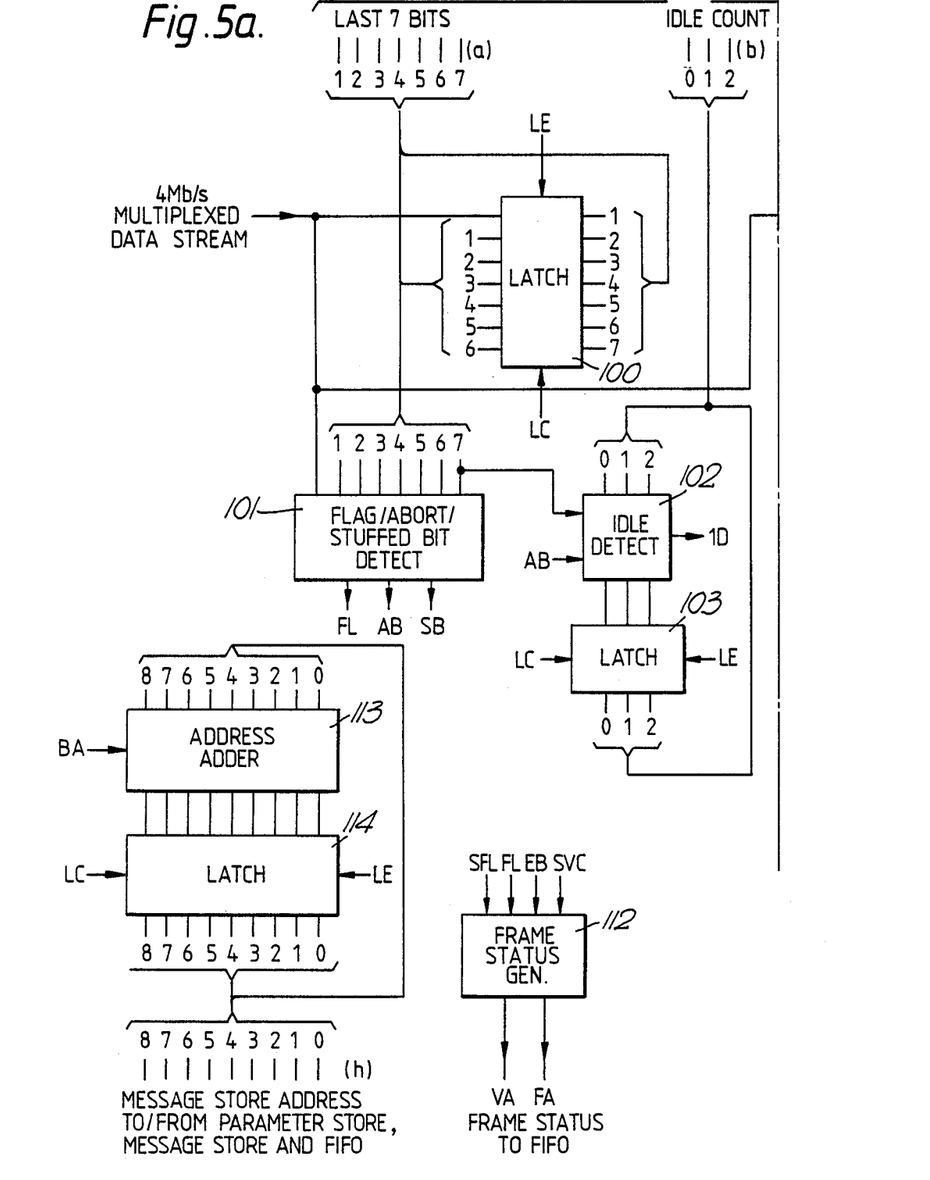
Figure 5B:
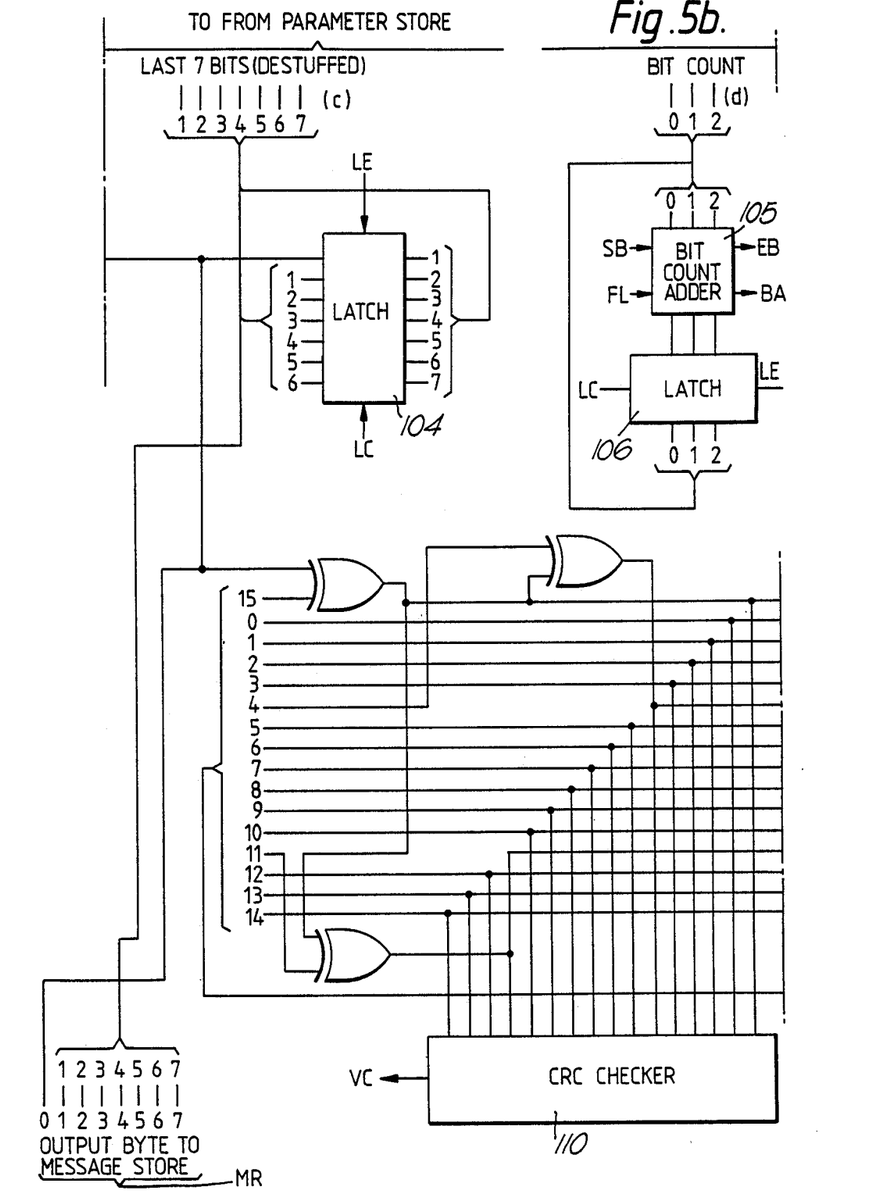
Figure 5C:
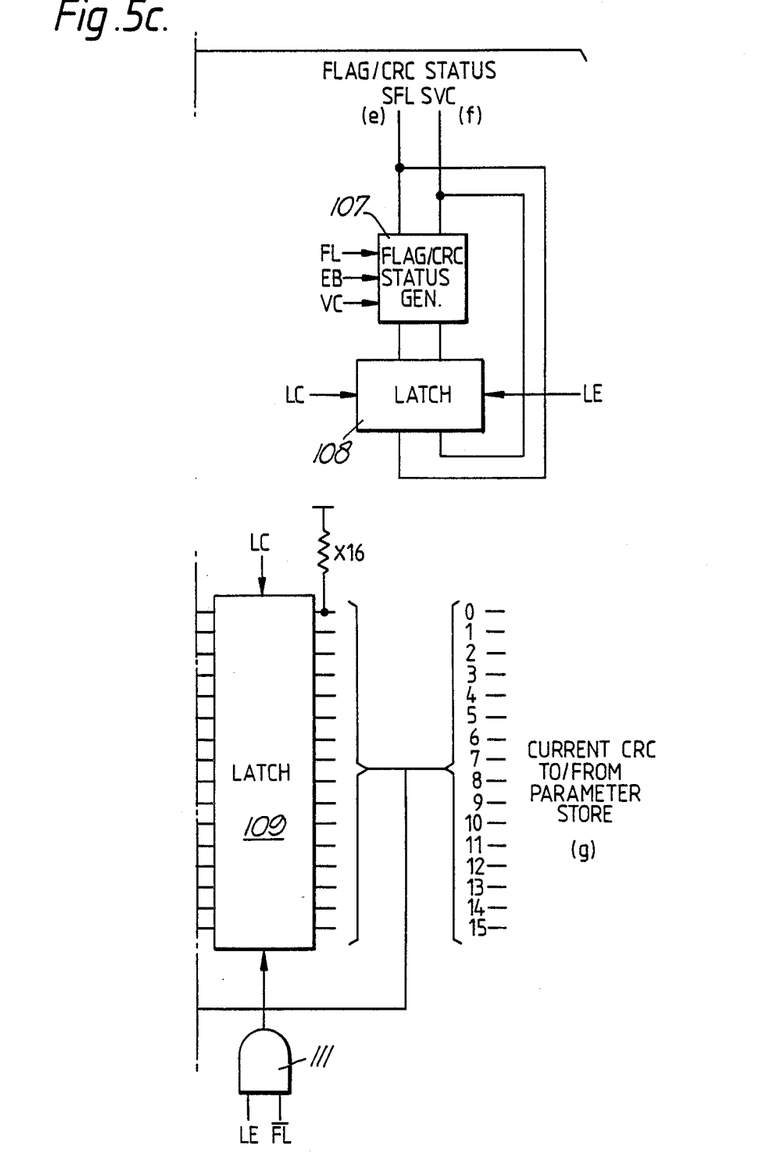

Referring now to FIG. 5, which shows detail of the receiving element 10, together with FIG. 4, for each new received bit from the 4 Mbit/s input the element 10 takes 47 bits from the channel parameter store 30 which form the channel parameters for the channel to which that new bit belongs, and uses combinational logic to perform the following operations.

(i) Detection of flags, abort and idle.
(ii) Removal of inserted zeros.
(iii) CRC (cyclic redundancy check) generation and validation.
(iv) Assembly of bytes and control of their transfer to the incoming message store, The new 47 bits generated by these operations are written back into the channel parameter store 30. Thus for each new received bit, one read and one write cycle are performed on the channel parameter store which is a 47×256 bit RAM.

The 47 bits stored in RAM by the channel parameter store 30 for each of the 256 channels, as they appear in clockwise order around FIG. 5, are as follows.

(a) The last seven received bits for flag, abort and stuffed bit detection.

(b) A 3 bit count of the number of contiguous ones passing through the receiver. This, together with the abort detector, is used to detect 15 contiguous ones which is the HDLC idle condition.

(c) The last seven received bits with inserted zeros removed for byte assembly.

(d) A 3 bit count of the number of bits received since the end of the last flag. This is used to indicate byte boundaries.

(e) One bit to indicate that the last byte received was a flag.

(f) One bit to indicate that the CRC (cylic redundancy check) was valid at the last byte boundary.

(g) 16 bits to indicate the current CRC (h) A 9 bit address (MBA) to indicate where the next byte is to be stored in the Message Store.

The detailed operation of the HDLC receiving element shown in FIG. 5 will be apparent from the following mnemonics, descriptions and truth tables.

LE Latch Enable–enables tristate latch outputs.
LC Latch Clock
FL Flag–indicates current 8 bits are a flag
AB Abort–indicates last 7 bits are all ones
SB Stuffed Bit–indicates last 7 bits are 0111110
ID Idle Detect–indicates last 15 bits are all ones
EB Eight Bits–indicates eight bits have been received since the last flag.
BA Byte Available–indicates eight bits have been received
 since the last flag and they are not a flag.
VC Validity Check–indicates current CRC is valid.
SVC Stored Validity Check–CRC status saved in channel parameter store.
SF Stored Flag–flag status saved in channel parameter store.
FA Frame Available–informs the message processor that a message has been received.
VF Valid frame–indicates that the received message is valid.

The last six out of the last seven bits received, (a), are entered with the new received bit from the input stream into a latch 100.

Figure 6:
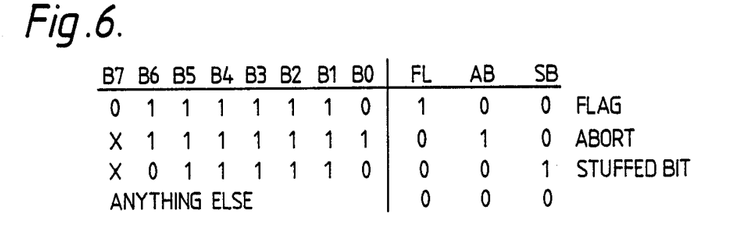

The last seven bits received, (a), are entered with the new bit, BO, into a flag/abort/stuffed bit detector 101 operating according to the truth table of FIG. 6.

Figure 7:
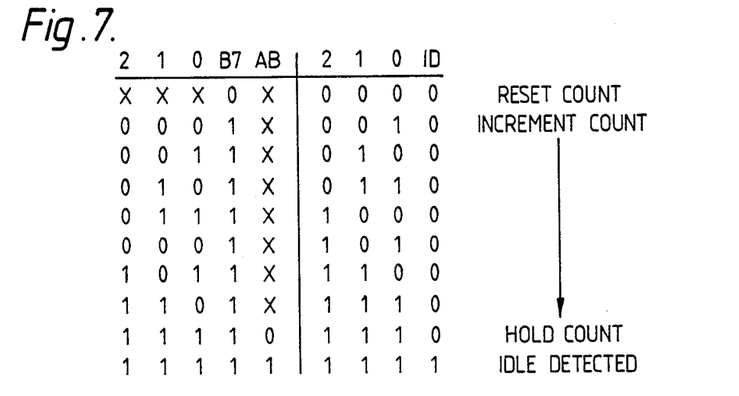

The three bit idle count, (b), is entered into an idle counter consisting of a detector 102 and latch 103. The idle counter counts ones as they are lost from the channel parameter RAM (i.e. the bit B7 received eight clock cycles previously). If this count reaches 7 and the eighth bit B is a one and an abort AB is being detected, then idle has been detected. This is shown by the truth table in FIG. 7.

The last six out of the last seven "destuffed" bits, (c), are entered with the new received bit from the input stream into a latch 104.

Figure 8:
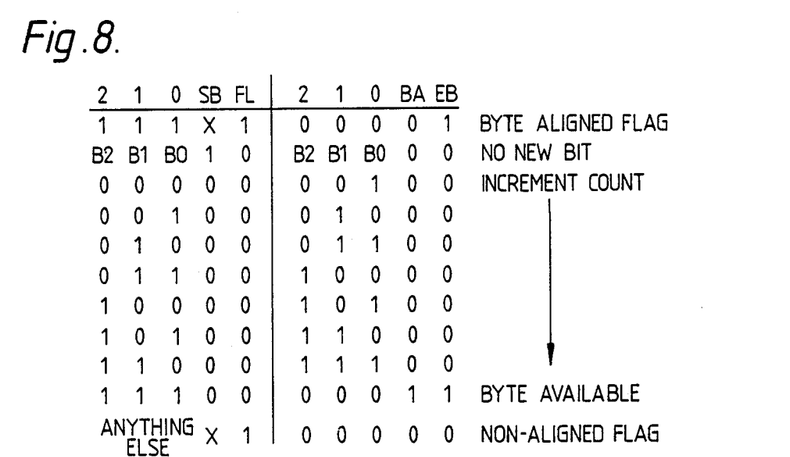

The three bit count (d) is entered into a bit count adder consisting of a detector 105 and latch 106. The write cycle to the CRC and "destuffed" bits section of the channel parameter store is inhibited if SB is active (i.e. the last bit received is a stuffed bit). The BA (Byte Available) signal is used to write the output byte MB, which consists of the last seven destuffed bits (e) and the new bit when the signal BA is available, into the incoming message store. The operation of the bit count adder is shown by the truth table in FIG. 8.

Figure 9:
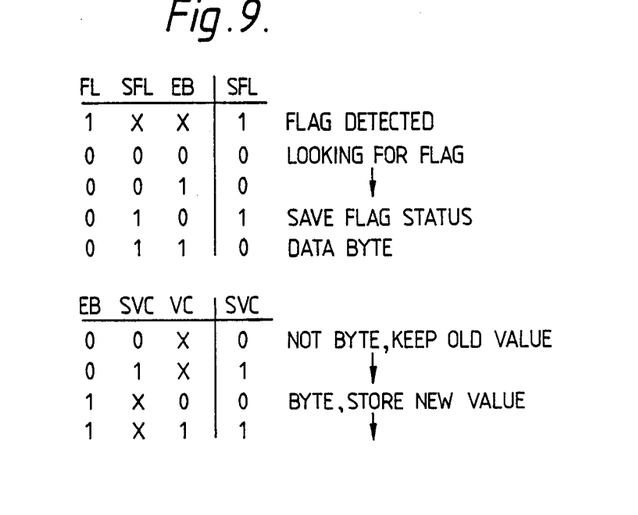

The one bit channel parameters SFL, (e), and SVC, (f), are entered together with the signals FL, EB and VC into a stored flag status and stored CRC status generator consisting of a detector 107 and latch 108 to produce new SFL and SVC channel parameters, according to the two truth tables shown in FIG. 9.

The current CRC (cyclic redundancy check) 16 bits are entered together with the new received bit via the gates shown to a latch 109 to provide a new 16 bits and to a checker 110 to provide the signal VC. The outputs of the latch 109 are disabled, via the gate 111, when a flag is detected and all ones are then written into the 16 bit CRC section of the channel parameter store.

Figure 10:
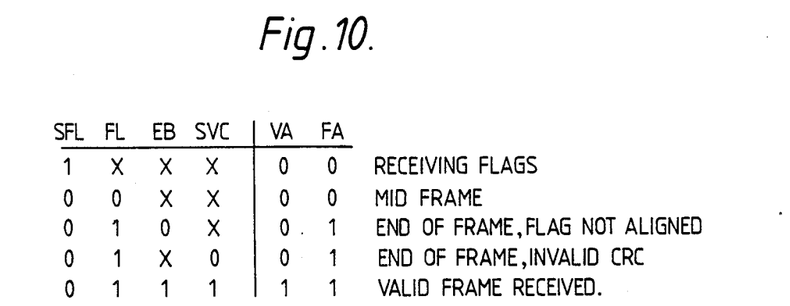

A frame status generator 112 responds to the signals SFL, FL, EB and SVC to produce the validity status signals VA and FA, according to the truth table of FIG. 10. The signals VA, FA thus indicate the result of checking the 16 bit frame check sequence at the end of each HDLC frame.

An address adder 113 increments the nine bit message byte address MBA (h) from the channel parameter store in response to the byte available signal BA and provides a new address MBA via a latch 114. This nine bit address corresponds to 512 bytes storage per channel which is provided in the incoming message store. In this particular implementation it is envisaged that the incoming messages can be of variable length up to 256 bytes. Storage is thus provided in the incoming message store for two messages per channel so that one message can be read out and processed by the message processing means 60 (as previously described with reference to FIG. 4) while the next message for that channel is being written in. The message byte address MBA which is provided to the F1F0 buffer 50, as described previously with reference to FIG. 4, with the validity status signals VA, FA indicating the end of a frame gives the address of the last byte of each message, and hence also the address of the first byte of the next message to the message processing means 60 (FIG. 4).

The channel allocation means 20, as previously referred to with respect to FIG. 4, may be implemented as a ROM or a RAM store. For a 4 Mbit/s multiplexed input data stream as described so far containing two consecutive bits of each of 256 16K bit/s signalling channels, the channel allocation store is arranged to provide the same channel number for two consecutive clock periods of the 4Mbit/s stream. Simply by providing the stored information in the channel allocation means ROM or RAM such that a null output (no channel accessed) is indicated for alternate 4 Mbit/s clock periods, the same apparatus as described above can be arranged to deformat 256 time division multiplexed 8K bit/s signalling channels provided in the 4Mbit/s input stream. As another example, provision by the channel allocation store of the same channel number for eight consecutive counts of the 4 Mbit/s clock will enable the same apparatus to deformat 64 time division multiplexed channels each having a signalling rate of 64K bit/s. By suitable arrangement of the channel allocation store a combination of signalling channels having different data rates, for example at 8K bit/s, 16K bit/s and 64K bit/s may be deformatted and, furthermore, multiple bits for the same signalling channel need not be consecutive but may be spread throughout each frame of the multiplexed input stream. Multiplexed input streams having data rates lower or higher than 4 Mbit/s may be used, according to the number of signalling channels and signalling rates which it is desired to accommodate. The principle is the provision of a time division multiplexed input data stream in which less than one frame of each formatted channel is present in each frame of the multiplexed stream, and correspondingly arranged channel allocation means.

Referring now back to FIG. 4, there is shown in dotted outline formatting and transmitting means 80 for receiving unformatted messages from the message processing means 60 for a plurality of further data information channels and transmitting those messages in a single time division multiplexed ouput data stream at 4 Mbit/s, the messages for each further data information channel each being formatted within a flag, message, frame check sequence, flag frame within the multiplexed output data stream and less than one frame of each formatted further channel being present in each frame of the multiplexed output data stream. Transmission of the 4 Mbit/s stream is accomplished in a similar manner to the reception which has been described above. The section 80 includes an outgoing message store into which are written the unformatted messages received by the message processing means 60, output channel allocation means which provides an output channel number for each new bit to be transmitted in the multiplexed output data stream, an output channel parameter store, and processing and transmitting means which receives message bytes one at a time from the outgoing message store and, by interaction with the output channel parameter store, processes those messages for transmission in the multiplexed output data stream. There will be detailed differences in the implementation of transmission compared to reception, as follows.

An extra RAM is required to enable the processing means 60 to control the state of each channel. This RAM stores the following information:
 (i) 2 bits indicating the operation to be performed, i.e.
   send flags
   send frame
   send abort
   send idle,
 (ii) A 9 bit address indicating the start of the message within the outgoing message store,
 (iii) A 9 bit address indicating the end of the message with the outgoing message store.

Also the FIFO buffer within the section 80 only has to indicate that the operation requested has been completed.

In this case there will also be provided in the data communications system means for demultiplexing the plurality of formatted further information channels from the single multiplexed output data stream and means for separately conveying each of the plurality of formatted further information channels. This can be implemented by providing the reverse of the multiplexing functions already described with reference to FIGS. 1 to 3.

We claim:

1. A data communications system for handling a plurality of formatted data information channels each containing signalling information, the system comprising:

(A) a line circuit for each data information channel;
 (B) means for multiplexing the plurality of formatted information channels received at the line circuits into a single time division multiplexed input data stream in which less than one frame of each formatted channel is present in each frame of the multiplexed stream; and
 (C) deformatting means including receiving and processing means for receiving successive bits of the multiplexed input data stream, processing the received bits successively, detecting when a complete message byte from an information channel has been received, and writing each detected message byte into an incoming message store for subsequent transmission,
   (i) said receiving and processing means including input channel allocation means for providing an input channel number for each new received bit of the multiplexed input data stream, and an input channel parameter store which responds to each input channel number to provide to the receiving and processing means a set of channel parameters, the set of channel parameters being processed with the relevant new bits to detect if the new received bit completes a message byte for its originating channel, and to provide a new set of parameters for that channel which is written back into the channel parameter store, the set of channel parameters including information characterizing the circuit status of the input data stream with a single frame of that channel, a message byte address, and the previous n−1 bits received for that channel, each channel message byte having n bits.

2. A system as claimed in claim 1, and including a first-in, first-out buffer, and wherein the receiving and processing means, on detecting a complete message byte from one of the formatted channels multiplexed to form the input data stream generates a validity status signal and writes into the input of the buffer the location in the incoming message store of the last message byte in each message and its validity status.

3. A system as claimed in claim 2, and further including formatting means for receiving unformatted messages from the receiving and processing means and transmitting the unformatted messages in a time division multiplexed output data stream containing a plurality of data channels, each of the messages being formatted by the formatting means with a flag, message, frame check sequence, flag frame within the multiplexed output data stream, and less than one frame of each formatted data channel being present in each frame of the multiplexed output data stream.

4. A system as claimed in claim 3, wherein the formatting means include an outgoing message store into which the unformatted messages from the receiving and processing means are written, output channel allocation means which provide an output channel number for each new bit to be transmitted in the multiplexed output data stream, an output channel parameter store, and processing and transmitting means which receives message bytes one at a time from the outgoing message store and interacts with the output channel parameter store to process the messages for transmission in the multiplexed output data stream.

5. A system as claimed in claim 4, and further including means for demultiplexing the multiplexed data output stream to provide a plurality of separate, formatted data channels.

6. A data communications system for handling a plurality of formatted data information channels each containing signalling information, the system comprising:
(A) a line circuit for each data information channel;
(B) means for multiplexing the plurality of formatted information channels received at the line circuits into a single time division multiplexed input data stream in which less than one frame of each formatted channel is present in each frame of the multiplexed stream; and
(C) deformatting means including receiving and processing means for receiving successive bits of the multiplexed input data stream, processing the received bits successively, detecting when a complete message byte from an information channel has been received, and writing each detected message byte into an incoming message store for subsequent transmission,
(i) said receiving and processing means including input channel allocation means for providing an input channel number for each new received bit of the multiplexed input data stream, and an input channel parameter store which responds to each input channel number to provide to the receiving and processing means a set of channel parameters, the set of channel parameters being processed with the relevant new bits to detect if the new received bit completes a message byte for its originating channel, and to provide a new set of parameters for that channel which is written back into the channel parameter store, the set of parameters including the previous n-1 bits received for that channel, each channel message byte having n bits.

7. A system as claimed in claim 6, wherein the set of channel parameters also includes information characterizing the circuit status of the input data stream with a single frame of that channel and a message byte address.

* * * * *